(12) United States Patent
Sugiura et al.

(10) Patent No.: US 11,508,954 B2
(45) Date of Patent: Nov. 22, 2022

(54) NON-AQUEOUS ELECTROLYTE SECONDARY BATTERY AND POSITIVE ELECTRODE ACTIVE MATERIAL

(71) Applicants: TOYOTA JIDOSHA KABUSHIKI KAISHA, Toyota (JP); DAIICHI KIGENSO KAGAKU KOGYO CO., LTD., Osaka (JP)

(72) Inventors: Ryuta Sugiura, Toyota (JP); Daisuke Horikawa, Toyota (JP); Sadahiro Yagishita, Osaka (JP); Taku Nishikawa, Osaka (JP)

(73) Assignees: TOYOTA JIDOSHA KABUSHIKI KAISHA, Toyota (JP); DAIICHI KIGENSO KAGAKU KOGYO CO., LTD., Osaka (JP)

( * ) Notice: Subject to any disclaimer, the term of this patent is extended or adjusted under 35 U.S.C. 154(b) by 326 days.

(21) Appl. No.: 16/919,285

(22) Filed: Jul. 2, 2020

(65) Prior Publication Data
US 2021/0005880 A1 Jan. 7, 2021

(30) Foreign Application Priority Data
Jul. 4, 2019 (JP) .............................. JP2019-125338

(51) Int. Cl.
| | |
|---|---|
| *H01M 4/134* | (2010.01) |
| *H01M 4/36* | (2006.01) |
| *H01M 10/0525* | (2010.01) |
| *H01M 4/58* | (2010.01) |
| *H01M 4/02* | (2006.01) |

(52) U.S. Cl.
CPC ........... *H01M 4/134* (2013.01); *H01M 4/366* (2013.01); *H01M 4/58* (2013.01); *H01M 10/0525* (2013.01); *H01M 2004/028* (2013.01)

(58) Field of Classification Search
None
See application file for complete search history.

(56) References Cited

U.S. PATENT DOCUMENTS
2015/0093651 A1   4/2015   Aihara et al.

FOREIGN PATENT DOCUMENTS
JP   2015072772 A   4/2015

OTHER PUBLICATIONS

Zhang et al., J. Solid State Electrochem (2017), 21:3189-3194. (Year: 2017).*

* cited by examiner

*Primary Examiner* — Eli S Mekhlin
(74) *Attorney, Agent, or Firm* — Dickinson Wright, PLLC

(57) ABSTRACT

A non aqueous electrolyte secondary battery includes a positive electrode containing a positive electrode active material, a negative electrode, and a non aqueous electrolyte, and the positive electrode active material includes a positive electrode active material particle containing a lithium transition metal compound, and a coating portion coating at least a part of a surface of the positive electrode active material particle. The coating portion contains a lithium ionic conductor containing lithium, a phosphoric acid group, and yttrium. The lithium ionic conductor includes a region A in which a ratio of yttrium is relatively rich and a region B in which the ratio of yttrium is relatively poor.

6 Claims, 2 Drawing Sheets

NON-AQUEOUS ELECTROLYTE SECONDARY BATTERY AND POSITIVE ELECTRODE ACTIVE MATERIAL

CROSS-REFERENCE TO RELATED APPLICATION

This application claims priority to Japanese Patent Application No. 2019-125338 filed on Jul. 4, 2019, incorporated herein by reference in its entirety.

BACKGROUND

1. Technical Field

The disclosure relates to a non-aqueous electrolyte secondary battery and a positive electrode active material.

2. Description of Related Art

A non-aqueous electrolyte secondary battery is light and provides a high energy density, and hence is preferably used as a portable power supply, a high output power supply for vehicle, and the like. As the non-aqueous electrolyte secondary battery has been widely practically used, there are increasing demands for improvement in various characteristics in accordance with application. For example, as for an active material that absorbs and desorbs a charge carrier in a secondary battery, it is preferable for reducing internal resistance of the battery to instantly insert/extract a large amount of lithium ions more smoothly. Therefore, for example, a technique to coat the surface of a positive electrode active material particle with a coating material having lithium ionic conductivity has been proposed (see, for example, Japanese Patent Application Publication No. 2015-072772).

SUMMARY

For example, JP 2015-072772 A discloses that a positive electrode active material of a sulfide-based all-solid-state battery is coated by a coating material having ionic conductivity and containing one or more elements out of Sc, Ti, V, Y, Zr, Nb, Ca, Sr, Ba, Hf, Ta, Cr, Mo, and W, lithium, and phosphoric acid. According to JP 2015-072772 A, when the positive electrode active material having the aforementioned composition is used, a lithium ion is efficiently conducted between a solid electrolyte layer and a positive electrode layer, and in addition, a reaction between the sulfide-based solid electrolyte layer and the positive electrode layer can be reduced to reduce high interface resistance between the solid electrolyte layer and the positive electrode layer. According to examination made by the present inventors, however, there still is room for further improvement in the composition of the positive electrode active material.

The present disclosure provides a non-aqueous electrolyte secondary battery improved in a resistance characteristic and an overcharge characteristic. In another aspect, the present disclosure provides a positive electrode active material that can be suitably used in this non-aqueous electrolyte secondary battery.

The present inventors were making earnest examination on a positive electrode active material coated with a material having lithium ionic conductivity for purposes of further improvement of battery performances. As a result, it was found that a resistance characteristic and an overcharge characteristic are largely improved by introducing a specific element into a lithium ionic conductor having a specific crystal structure, and thus, the present technique was accomplished. Specifically, a non-aqueous electrolyte secondary battery disclosed herein includes a positive electrode containing a positive electrode active material, a negative electrode, and a non-aqueous electrolyte, and the positive electrode active material includes a positive electrode active material particle containing a lithium transition metal compound, and a coating portion coating at least a part of a surface of the positive electrode active material particle. The coating portion contains a lithium ionic conductor containing lithium, a phosphoric acid group, and yttrium, and the lithium ionic conductor includes a region A in which a ratio of yttrium is relatively rich, and a region B in which the ratio of yttrium is relatively poor.

A compound containing lithium and a phosphoric acid group can be, for example, trilithium phosphate (hereinafter sometimes simply referred to as "LPO") having a composition represented by a general formula, $Li_3PO_4$ or the like. The LPO has a skeleton structure formed by a $PO_4$ tetrahedron and a $LiO_6$ octahedron similarly to a lithium ionic conductive material having a $\gamma$-$Li_3PO_4$ structure designated as LISICON (lithium super ionic conductor), and can exhibit lithium ionic conductivity when Li deficiency or excess Li is introduced. Therefore, when the surface of the positive electrode active material particle is coated with LPO and yttrium (Y) is introduced into this LPO, the skeleton structure of the LPO is strained, and the lithium ionic conductivity is probably increased in the coating portion. Besides, Y can become a trivalent cation, and hence can probably trap, at a time of overcharge, oxygen released due to excessive lack of lithium in the positive electrode active material to suitably reduce a heat generating reaction between oxygen and the electrolyte. In addition, Y is localized in the Y-rich region A and the Y-poor region B in the coating portion, and thus, these effects are remarkably increased. When such a positive electrode active material is used, a non-aqueous electrolyte secondary battery improved in a resistance characteristic and an overcharge characteristic can be realized.

The lithium ionic conductor may be amorphous. Thus, the ionic conductivity of the coating portion is increased, and the number of oxygen trap sites is increased, and hence, a secondary battery further improved in the resistance characteristic and the overcharge characteristic is provided.

The lithium ionic conductor may have a composition represented by the following general formula: $Li_xY_yPO_{4-z}$. In the formula, z represents an amount of oxygen deficiency, and x and y may satisfy $1.5 \leq x \leq 4$ and $0.005 \leq y \leq 3$. Thus, the phosphoric acid skeleton can be sufficiently strained, and hence a secondary battery having well-balanced a resistance characteristic and an overcharge characteristic is provided.

In the region A, the ratio of yttrium is equal to or higher than a ratio of phosphorus, and in the region B, the ratio of yttrium is lower than the ratio of phosphorus, and a ratio R of an area of the region A to a total area of the region A and the region B may be 0.01 or more and 0.5 or less. When this composition is employed, an ion supply property to the active material particle is suitably increased or oxygen trapping performance is improved on the interface between the region A and the region B.

The coating portion may further contain a yttrium salt. When this composition is employed, the heat generation at the time of overcharge is remarkably reduced.

The positive electrode active material having a composition disclosed herein contains the coating portion on the surface of the positive electrode active material particle, and owing to contribution made by the coating portion, the resistance characteristic and the overcharge characteristic are improved. It is noted that resistance reduction described in JP 2015-072772 A is realized by preventing direct contact between the solid electrolyte and the active material by the coating portion to reduce an interface reaction. In contrast, the positive electrode active material having the above-described composition is advantageous because, not only when a solid electrolyte is used but also when an electrolyte solution is used, the resistance reduction effect is greatly improved due to the improved ionic conductivity of the coating portion itself, and in addition, overcharge resistance can be also improved. Owing to these features, a non-aqueous electrolyte secondary battery constructed by using the positive electrode active material is provided, for example, as a product attaining both high rate charge/discharge characteristics and overcharge resistance. Such safety against high temperature can be applied to, for example, a secondary battery that has a stacked structure including power storage elements stacked in a plurality of layers (such as a stacked electrode assembly or a wound electrode assembly), and is used in a usage where a large current is used for repeated charge/discharge at a high rate. Accordingly, the non-aqueous electrolyte secondary battery herein disclosed is used as, for example, a driving power supply (main power supply) for a vehicle, particularly as a driving power supply for a hybrid vehicle, a plug-in hybrid vehicle or the like.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Figure 1:
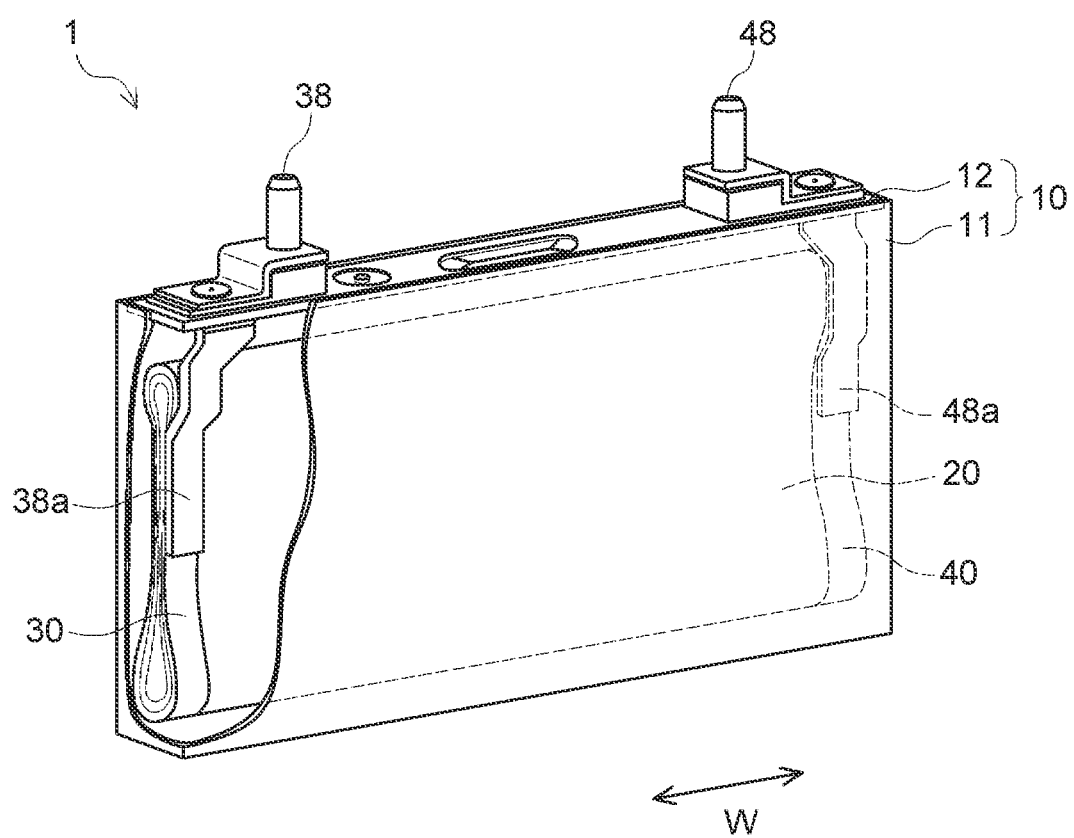
FIG. 1 is a cutaway perspective view schematically illustrating a structure of a lithium ion battery according to one embodiment.

Now, one embodiment of the present disclosure will be described with reference to the accompanying drawings. It is noted that matters not particularly described herein but necessary for practicing the present disclosure (such as a part of a structure and an operation of a non-aqueous electrolyte secondary battery not characterizing the present disclosure) can be understood as matters of design choice of those skilled in the art based on the conventional technique of the field. The present disclosure can be practiced based on the contents disclosed herein and common technical knowledge of the field. Besides, in the drawings mentioned below, like reference signs are used to refer to members and portions exhibiting like functions, so as to omit or simplify abundant description in some cases. It is noted that a dimensional relationship (in length, width, thickness and the like) illustrated in each drawing does not always reflect actual dimensional relationship. In the present technique, an expression "A to B" indicating a numerical range means "A or more and B or less".

In the present technique, the term "secondary battery" refers to a repeatedly chargeable/dischargeable electricity storage device in general, and is a term embracing so called storage batteries such as a lithium secondary battery and a lithium polymer battery, and storage devices such as an electric double layer capacitor. Besides, the term "non-aqueous electrolyte secondary battery" refers to a secondary battery that is charged/discharged by using a non-aqueous type electrolyte as a charge carrier, and the electrolyte may be any one of a solid electrolyte, a gel electrolyte and a non-aqueous electrolyte. As a composition capable of obtaining benefits of the present technique, the electrolyte may be, for example, a non-aqueous electrolyte solution that is in a liquid state at normal temperature (for example, 25° C.) and contains a supporting salt (electrolyte) dissolved in a non-aqueous solvent as a charge carrier. The term "active material" refers to a substance capable of reversibly absorbing and desorbing a chemical species used as a charge carrier in a secondary battery. Now, the present technique will be described assuming that the non-aqueous electrolyte secondary battery is a lithium ion secondary battery.

Lithium Ion Secondary Battery

Figure 2:
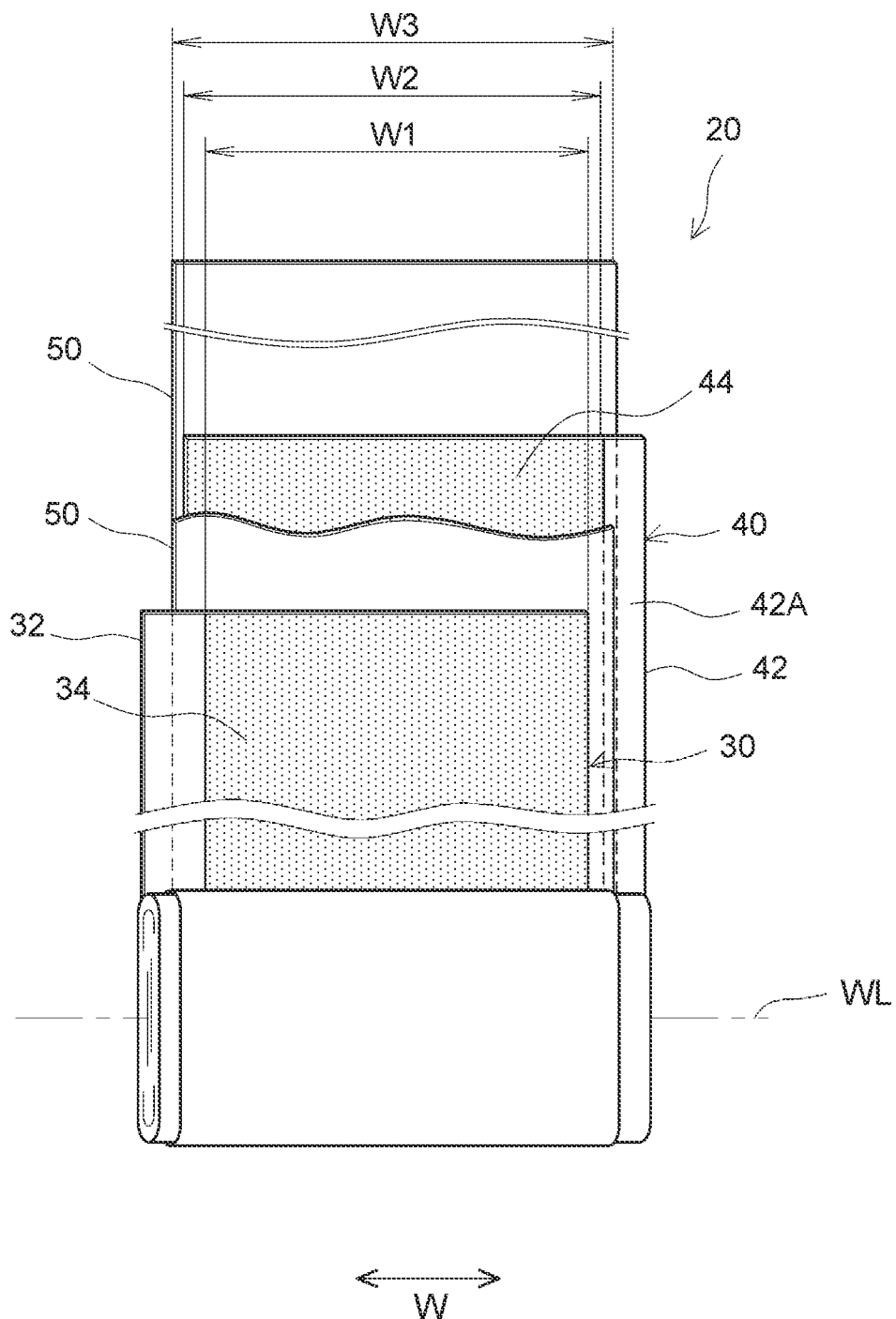
FIG. 2 is a partial developed view illustrating a structure of a wound electrode assembly.

FIG. 1 is a cutaway perspective view illustrating the structure of a lithium ion battery (hereinafter simply referred to as the "secondary battery" or the like) 1 according to one embodiment. FIG. 2 is a partial developed view illustrating the structure of a wound electrode assembly 20. The lithium ion battery 1 has a structure in which the wound electrode assembly 20 including a positive electrode 30, a negative electrode 40, and a separator 50 is housed, together with a non-aqueous electrolyte solution (not shown), in a battery case 10. A reference sign W of the drawings indicates a widthwise direction of the battery case 10 and the wound electrode assembly 20, and is a direction according with a winding axis WL of the wound electrode assembly 20. The electrode assembly 20 is constructed by stacking the separator 50, the negative electrode 40, the separator 50, and the positive electrode 30 in the stated order.

The positive electrode 30 includes a positive electrode collector 32 and a positive electrode active material layer 34. The positive electrode active material layer 34 is a porous medium containing a positive electrode active material, and can be impregnated with an electrolyte solution. The positive electrode active material desorbs or absorb a lithium ion corresponding to a charge carrier into or from the electrolyte solution. The positive electrode active material layer 34 can additionally contain a conductive material or a binder. The positive electrode active material layer 34 is provided in a part of a surface (one surface or both surfaces) of the positive electrode collector 32. The positive electrode collector 32 is a member for holding the positive electrode active material layer 34, and supplying or collecting a charge to or from the positive electrode active material layer 34. The positive electrode collector 32 is suitably constructed from a conductive member that is electrochemically stable under a positive electrode environment within the battery, and contains a metal having good conductivity (such as aluminum, an aluminum alloy, nickel, titanium, or stainless steel).

Typically, in the positive electrode active material layer 34, the positive electrode active material in the form of a powder is bound to a conductive material with a binder (binding agent), and is connected to the positive electrode collector 32. In a structure containing the conductive material, a carbon material such as carbon black (typically, acetylene black or Ketchen black), activated carbon, graphite, or carbon fiber can be suitably used as the conductive material. These may be used singly or in combinations of two or more. As the binder, any of various resin compositions having binding performance can be used. Examples include an acrylic-based resin such as a (meth)acrylic acid ester polymer, a halogenated vinyl resin such as polyvinylidene fluoride (PVdF), and polyalkylene oxide such as polyethylene oxide (PEO). The positive electrode active material layer 34 can be produced by obtaining a positive electrode slurry by dispersing the conductive material and the binder together with the positive electrode active material described later in an appropriate dispersion medium (such as N-methyl-2-pyrrolidone), supplying the positive electrode slurry onto the surface of the positive electrode collector 32, and drying the resultant to remove the dispersion medium.

The positive electrode active material contains a positive electrode active material particle, and a coating portion coating at least a part of the surface of the positive electrode active material particle. The positive electrode active material is in the form of a powder containing a plurality of such positive electrode active material particles each having the coating portion. Here, the coating portion is provided directly on the surface of the positive electrode active material particle. In other words, the coating portion is provided directly on the surface of the positive electrode active material particle without another compound such as a binder disposed therebetween. Typically, the coating portion is deposited on the surface of the positive electrode active material particle. Thus, the coating portion is disposed closely, more preferably to be oriented, on the surface of the positive electrode active material particle. The coating portion may coat the whole of the surface of the positive electrode active material particle, or may coat a part thereof.

The coating portion contains a lithium ionic conductor essentially containing lithium (Li), a phosphoric acid group ($PO^{4-}$), and a yttrium (Y). To contain a phosphoric acid group can be understood as to contain, for example, a phosphoric acid component. This lithium ionic conductor typically has a skeleton structure formed by a $PO_4$ tetrahedron and a $LiO_6$ octahedron, and Y is substituted with some Li in the $LiO_6$ octahedron or disposed between Li in the $LiO_6$ octahedron. For example, $Li_3PO_4$ is employed as a mother structure (basic skeleton), in which Y is partially substituted. In this manner, Li deficiency or interstitial Li is introduced into the basic skeleton. As a result, lithium ion deviation is caused in the mother structure, and hence a lithium ion can move via the Li deficiency or interstitial Li, and thus, lithium ionic conductivity is exhibited. Since the coating portion thus exhibits the lithium ionic conductivity, absorption and desorption of a lithium ion into/from the positive electrode active material particle can be smoothly performed, resulting in reducing interface resistance between the electrolyte and the positive electrode active material particle. Here, the term "lithium ionic conductor" can embrace, without particular limitation, a compound having ionic conductivity of a lithium ion ($Li^+$). The lithium ionic conductor has a degree of lithium ionic conductivity, at around room temperature (hereinafter 25° C. unless otherwise mentioned), preferably of $10^{-10}$ $Scm^{-1}$ or more, for example, $10^{-8}$ $Scm^{-1}$ or more, and more preferably $10^{-7}$ $Scm^{-1}$ or more.

Y is an element that can become a trivalent cation, and its ionic radius can be about 1 to 1.2 angstroms. Here, when Y is contained in the coating portion having the basic skeleton of LPO, the lithium ion deviation (in other words, a portion having a high cationicity) and an ion diffusion path are suitably formed in the mother structure, and probably for this reason, a phase structure realizing high lithium ionic conductivity can be stabilized at a lower temperature (of a battery operating temperature range). Accordingly, as compared with a case where Y is not contained, or a case where another element is introduced, the absorption and desorption of a lithium ion into and from the positive electrode active material particle can be smoothly performed, and hence the interface resistance between the electrolyte and the positive electrode active material particle can be reduced. Besides, a function to suitably trap oxygen (O) in the portion having high cationicity of the coating portion is imparted, and when the structure of the positive electrode active material coated by the coating portion becomes unstable due to overcharge or the like, elution of an oxygen atom corresponding to a constituting element of the positive electrode active material is probably reduced, so that heat generation through a reaction between oxygen and the electrolyte can be reduced.

The lithium ionic conductor may be crystalline, amorphous, or a mixture of these. The lithium ionic conductor is more preferably amorphous. In general, a crystalline ionic conductor and an amorphous ionic conductor are largely different in material design. In a crystalline material, the ionic conductivity is improved by constructing a crystal structure more suitable to ionic conductivity, but in an amorphous material, the ionic conductivity is improved by disturbing the structure. No matter whether the lithium ionic conductor disclosed herein is crystalline or amorphous, it can exhibit the effects of reducing the interface resistance and reducing the heat generation of the positive electrode active material particle described above as long as Y is introduced as described above. When the lithium ionic conductor is amorphous, an ion conduction path can be three-dimensionally constructed, so as to evenly connect a conductive path in a grain boundary of the active material present on the interface with the positive electrode active material particle, and probably for this reason, the above-described effects are more remarkably exhibited. The coating portion containing the lithium ionic conductor can be formed on the surface of the positive electrode active material particle simply by a liquid phase method. For example, here, a lithium ionic conductor (precursor) is heated to its crystallization temperature or more in general, but when the conductor is heated at a temperature lower than the crystallization temperature, the coating portion can be made amorphous.

It can be checked by performing X-ray diffraction (XRD) analysis whether the lithium ionic conductor of the coating portion is crystalline or amorphous. For example, crystallinity of the lithium ionic conductor can be evaluated through the XRD analysis of the positive electrode active material disclosed herein depending on whether or not a peak derived from the lithium ionic conductor is observed in addition to a peak of the crystallinity derived from the positive electrode active material particle described later, and when observed, depending on the shape of the peak. For example, when a peak attributed to LPO and an analog thereof (namely, a Y-substitution product of LPO, or the like) is obtained, it can be said that the lithium ionic conductor has a crystalline portion. Alternatively, when a peak attributed to LPO and an analog thereof is not detected even though the lithium ionic conductor has been found to exist by qualitative and quantitative analysis, it can be said that the lithium ionic conductor is amorphous.

Such a lithium ionic conductor can be understood, as a whole, a compound having a composition represented by, for example, a general formula, $Li_xY_yPO_{4-z}$. In the formula, x represents a ratio of Li, is not strictly defined, and can be preferably defined as $1.5 \leq x \leq 4$. In the formula, y represents a ratio of Y, and can be a value larger than zero. In the formula, z represents an amount of oxygen deficiency assuring a charge neutral condition. Besides, z can be defined as $0 \leq z \leq 4$, and can be typically a value of zero to 1. When the lithium ionic conductor has such a composition, the coating portion can stably exhibit the above-described effects on the positive electrode active material particle.

The ratio x of Li in the stoichiometric composition of yttrium-containing lithium phosphate represented by the above-described general formula is 3, but x can be any of various values as long as the lithium ionic conductivity can be exhibited. The ratio x of Li may be typically a value of 1.5 or more and 4 or less. In the general formula, the ratio x of Li to P corresponding to the center of the $PO_4$ tetrahedron of the phosphoric acid skeleton is preferably about 1.5 or more because a lithium concentration is not too low and hence the resistance reduction effect can be easily exhibited in such a case. From the viewpoint of the degree of ionic conductivity, x is preferably about 2 or more, and more preferably 2.5 or more. It is noted that the ratio x of Li to P is preferably 3 or more because thus the degree of ionic conductivity is further increased owing to the presence of excessive lithium. When the ratio x of Li is excessive, however, the $\gamma$-$Li_3PO_4$ crystal structure is changed, and the degree of lithium ionic conductivity is lowered on the contrary. Accordingly, although depending on a ratio of Y described later, the ratio x of Li may be about 4 or less, and is more preferably 3.8 or less, or about 3.5 or less.

Besides, when the ratio y of Y is higher than zero, Y is contained in the structure, and hence the improvement of resistance and the improvement of an overcharge characteristic can be both attained. From the viewpoints of clearly exhibiting these effects, the ratio y of Y is preferably 0.005 or more. The ratio y of Y is more preferably 0.01 or more, more preferably 0.02 or more, and may be, for example, 0.05 or more, or 0.1 or more. Excessive addition of Y is, however, unpreferable because the effects of the addition of Y are saturated as well as the structure is changed to reduce the effects on the contrary. The ratio y of Y may be about 5 or less, and preferably 4 or less, about 3 or less, and for example, about 2 or less.

The coating portion may coat the whole of the surface of the positive electrode active material particle, or may coat a part thereof. For example, an exposed portion not coated with the coating portion may be present on the surface of the positive electrode active material particle. The exposed portion may be collectively present in a part of the surface of the positive electrode active material particle, or may be separated into a plurality of portions to be present in the form of islands. Besides, the coating portion may be present on the surface of the positive electrode active material particle in the form of granules, or may be present in the form of a film (layer). For example, a lithium ionic conductor in the form of a powder used as the coating portion may be attached or fixed on the surface of the positive electrode active material particle. Alternatively, a lithium ionic conductor used as the coating portion may cover, in the form of a layer, the surface of the positive electrode active material particle. Although specific examples are not described, the coating portion is preferably in the form of a layer because thus, contact efficiency with the lithium ionic conductor is increased, and the resistance reduction effect is increased (by, for example, about 10 to 30%) as compared with a case where the coating portion is present in the form of granules.

In the positive electrode active material disclosed herein, the lithium ionic conductor contained in the coating portion may have a partially different composition. For example, when the composition is partially different, the composition of the lithium ionic conductor preferably accords with the above-described composition as a whole. In other words, the coating portion may include the region A in which the ratio of Y is relatively rich, and the region B in which the ratio of Y is relatively poor. When the distribution of Y in the coating portion is thus uneven, a new function can be imparted to the lithium ionic conductivity of the coating portion. Specifically, when the coating portion includes the region A in which the ratio of Y is rich and the region B in which the ratio is poor, a difference in the lithium ionic conductivity is locally caused on a boundary region therebetween, and hence, for example, a lithium ion conduction path having high ionic conductivity can be formed in a thickness direction of the coating portion vertical to the surface of the positive electrode active material particle. Thus, a lithium ion supply property between the external electrolyte or the like and the positive electrode active material particle is probably increased in the coating portion. Besides, due to localization of a cationic region, oxygen trapping ability is probably improved.

Here, the region A in which Y is rich can be a region in which the ratio of Y is equivalent to or higher than the ratio of phosphorus (P). Here, in the region A, an atomic ratio of Y is higher than that of P, and the ratio of Y is rather high. Besides, the region B in which Y is poor can be a region in which the ratio of Y is lower than the ratio of P. Here, the ratios of the region A and the region B in the coating portion are not especially limited. From the viewpoint of taking advantage of the effect on the boundary between the region A and the region B region by increasing the ratio of the boundary region without excessively increasing the ratio of Y in the whole coating portion, however, the region A is preferably present locally in the region B. For example, the above-described effect can be obtained when an area ratio R of the region A to the whole coating portion (namely, a total area of the region A and the region B) is zero or more, and the ratio R may be 0.005 or more, is preferably 0.01 or more, and may be, for example, 0.05 or more, 0.1 or more, or 0.15 or more. In other words, the area ratio R of the region A can be understood as a localization ratio R of the element Y. Here, when a region in which Y is contained in a larger amount than P is excessively increased, the ratio of Y may be excessively contained in the whole coating portion, or the skeleton structure formed by the $PO_4$ tetrahedron and the $LiO_6$ octahedron may be difficult to stably retained, and therefore, such excessive increase is not preferred. Accordingly, the localization ratio R of Y is suitably about 0.7 or less, preferably 0.6 or less, or 0.5 or less, and may be, for example, 0.45 or less, 0.4 or less, or 0.35 or less.

The localization ratio R of the element Y can be obtained, for example, as follows: In the coating portion of the positive electrode active material, element distributions of Y and P are checked to divide the coating portion into the region A in which the element Y is rich, and the region B in which the element Y is poor. Each area of the regions A and B is calculated, and a ratio of the area of the region A to a total area of the region A and the region B (namely, the area of the coating portion) may be calculated as the area ratio R (namely, a localization ratio R). Here, the region A and the region B can be divided by checking the element distributions of Y and P in the coating portion in an image observed with an electron microscope (SEM, TEM, STEM or the like) by, for example, energy dispersive X-ray spectrometry (EDS) or electron energy-loss spectroscopy (EELS).

It is noted that the coating portion may contain a yttrium salt in addition to the lithium ionic conductor. When the coating portion contains a yttrium salt, at the time when the positive electrode active material particle is in an overcharged state, for example, the reaction with the electrolyte can be reduced to reduce the amount of heat generation to be small. The reason why such an effect is obtained is not clear, but presumed as follows: A yttrium salt is easily hydrated, and hence is present in, for example, a hydrated state with moisture unavoidably contained in a battery. Therefore, when the positive electrode active material particle enters an overcharged state to start generating heat, the yttrium salt contained in the coating portion is probably, for example, dehydrated to suitably mitigate or reduce the heat generation. The type of the yttrium salt is not especially limited, and may be a carbonate, a nitrate, a sulfate, an acetate, a phosphate, a chloride or the like. A ratio of the yttrium salt contained in the coating portion is, for example, adequately about 10% by mass or less.

A ratio of the coating portion is not strictly limited, and the above-described effects can be exhibited when the coating portion is formed even in a small ratio on the surface of the positive electrode active material particle. From the viewpoint of clearly obtaining the effects, the ratio of the coating portion is, per 100 parts by mass of the positive electrode active material particle, for example, preferably 0.01 parts by mass or more, and more preferably 0.03 parts by mass or more, 0.05 parts by mass or more, or 0.08 parts by mass or more. Excessive presence of the coating portion is not preferable because theoretical capacity per unit mass of the positive electrode active material is reduced. Accordingly, the ratio of the coating portion is, per 100 parts by mass of the positive electrode active material particle, for example, preferably 1 part by mass or less, more preferably 0.8 parts by mass or less, 0.5 parts by mass or less, or 0.3 parts by mass or less, and may be, for example, 0.1 parts by mass or less.

The positive electrode active material particle disclosed herein contains a lithium transition metal compound. As the lithium transition metal compound, any of various compounds used as a positive electrode active material in this type of non-aqueous electrolyte secondary batteries can be used. Suitable examples of the lithium transition metal compound include a lithium transition metal compound having a layered rock salt crystal structure, typified by a lithium cobalt oxide (such as $LiCoO_2$) or a lithium nickel cobalt manganese oxide (such as $LiNi_{1/3}Co_{1/3}Mn_{1/3}O_2$), a lithium transition metal compound having a spinel crystal structure typified by a lithium manganese oxide (such as $LiMn_2O_4$ or $LiMn_{2-x}Ni_yO_4$), and a lithium transition metal phosphate having an olivine crystal structure such as lithium manganese phosphate ($LiMnPO_4$) or lithium iron phosphate ($LiFePO_4$). Each of these may contain, as a transition metal element, another element different from Ni, Co and Mn, namely, any of various transition metal elements belonging to groups 3 to 11 of the Periodic Table of the Elements (excluding Ni, Co and Mn though), and specifically, may contain B, F, Mg, Al, Ca, Ti, V, Cr, Fe, Zr, Nb, Mo, Hf, Ta, and W. Besides, in addition to the transition metal elements, an element such as Ca, Mg, Al, B, or F may be contained. These may be contained singly or in combinations of two or more.

An average particle size ($D_{50}$) of the positive electrode active material is not especially limited, and is typically 0.5 μm or more, preferably 1 μm or more, 2 μm or more, and, for example, 3 μm or more, and is, for example, 20 μm or less, typically 15 μm or less, preferably 10 μm or less, and, for example, 7 μm or less. A ratio of the positive electrode active material in the whole positive electrode active material layer 34 may be about 50% by mass or more, typically 60% by mass or more, and, for example, 70% by mass or more, and can be typically 95% by mass or less, and, for example, 90% by mass or less. A ratio of the conductive material in the positive electrode active material layer 34 is, per 100 parts by mass of the positive electrode active material, typically 0.1 parts by mass or more, preferably 1 part by mass or more, and for example, 3 parts by mass or more, and is typically 15 parts by mass or less, preferably 12 parts by mass or less, and for example, 10 parts by mass or less. A ratio of the binder in the positive electrode active material layer 34 can be, per 100 parts by mass of the positive electrode active material, typically 0.5 parts by mass or more, preferably 1 part by mass or more, and for example, 2 parts by mass or more, and can be typically 10 parts by mass or less, preferably 8 parts by mass or less, and, for example, 5 parts by mass or less. Besides, a thickness (an average thickness; the same applies to the following description) of the positive electrode active material layer 34 obtained after pressing can be typically 10 μm or more, and for example, 15 μm or more, and can be typically 50 μm or less, and, for example, 30 μm or less. A density of the positive electrode active material layer 34 is not especially limited, can be typically 1.5 $g/cm^3$ or more, and for example, 2 $g/cm^3$ or more, and can be 3 $g/cm^3$ or less, and, for example, 2.5 $g/cm^3$ or less. The term "average particle size" herein refers to a cumulative 50% particle size ($D_{50}$) in a particle size distribution based on volume obtained by a laser diffraction scattering method unless otherwise mentioned.

The negative electrode 40 is constructed by providing a negative electrode active material layer 44 on a negative electrode collector 42. The negative electrode collector 42 is provided with a non-coated portion 42A in which the negative electrode active material layer 44 is not formed and the negative electrode collector 42 is exposed for current collection. The negative electrode active material layer 44 contains a negative electrode active material. Typically, in the negative electrode active material layer 44, the negative electrode active material in the form of particles can be bound to one another with a binder (binding agent), and can be connected to the negative electrode collector 42. The negative electrode active material absorbs and desorbs a lithium ion corresponding to a charge carrier from and to the electrolyte solution through charge/discharge. As the negative electrode active material, any of various materials conventionally used as a negative electrode active material of a lithium ion battery can be used without particular limitation. Suitable examples include a carbon material typified by artificial graphite, natural graphite, amorphous carbon, and a composite of any of these (such as amorphous carbon-coated graphite) and the like, and a lithium-storing compound such as a material forming an alloy together with lithium, such as silicon (Si), such a lithium alloy (for example, $Li_xM^2$, wherein $M^2$ represents C, Si, Sn, Sb, Al, Mg, Ti, Bi, Ge, Pb, or P, and X represents a natural number), or a silicon compound (SiO). The negative electrode 40 can be produced by, for example, obtaining a negative electrode slurry by dispersing, in an appropriate dispersion medium (such as water or N-methyl-2-pyrrolidone, preferably water), a negative electrode active material in the form of powder and a binder (for example, a styrene-butadiene copolymer (SBR), a rubber such as an acrylic acid-modified SBR resin (SBR-based latex), a cellulose-based polymer such as carboxymethylcellulose (CMC)), supplying the negative electrode slurry onto the surface of the negative electrode collector 42, and drying the resultant to remove the dispersion medium. As the negative electrode collector, a conductive member containing a metal having good conductivity (such as copper, nickel, titanium, or stainless steel) can be suitably used.

An average particle size ($D_{50}$) of the negative electrode active material particle is not especially limited, and may be, for example, 0.5 μm or more, preferably 1 μm or more, and more preferably 5 μm or more. Besides, the average particle size may be 30 μm or less, is preferably 20 μm or less, and more preferably 15 μm or less. A ratio of the negative electrode active material in the whole negative electrode active material layer 44 is suitably about 50% by mass or more, preferably 90% by mass to 99% by mass, and for example, 95% by mass to 99% by mass. When a binder is used, a ratio of the binder in the negative electrode active material layer 44 can be, per 100 parts by mass of the negative electrode active material, for example, about 0.1 parts by mass to 5 parts by mass, and is usually suitably about 0.5 parts by mass to 2 parts by mass. A thickness (an average thickness; the same applies to the following description) of the negative electrode active material layer 44 can be, for example, 10 μm or more, and typically 20 μm or more, and can be 80 μm or less, and typically 50 μm or less. Besides, a density of the negative electrode active material layer 44 is not especially limited, can be, for example, 0.8 g/cm$^3$ or more, and typically 1.0 g/cm$^3$ or more, and can be 1.5 g/cm$^3$ or less, typically 1.4 g/cm$^3$ or less, and, for example, 1.3 g/cm$^3$ or less.

The separator 50 is a composing element that insulates the positive electrode 30 and the negative electrode 40 from each other, and provides a transfer path of the charge carrier between the positive electrode active material layer 34 and the negative electrode active material layer 44. The separator 50 is disposed typically between the positive electrode active material layer 34 and the negative electrode active material layer 44. The separator 50 may be provided with a function to hold the non-aqueous electrolyte solution, and a shutdown function to close the transfer path of the charge carrier at a prescribed temperature. The separator 50 may be suitably constructed from a microporous resin sheet made of an olefin-based resin such as polyethylene (PE) or polypropylene (PP), or a resin such as polyester, cellulose, or polyamide. In particular, a microporous sheet made of a polyolefin resin such as PE or PP is preferred because a shutdown temperature can be suitably set in a range of 80° C. to 140° C. (typically 110° C. to 140° C., for example, 120° C. to 135° C.). The shutdown temperature refers to a temperature at which the electrochemical reaction of a battery is stopped at a time when the battery generates heat, and shutdown is typically caused when the separator 50 is melted or softened at this temperature. The separator 50 may have a single-layer structure containing a single material, or may have a multilayered structure (such as a three-layered structure including PP layers stacked on both surfaces of a PE layer) in which two or more microporous resin sheets different in material and properties (such as an average thickness and porosity) are stacked.

A thickness (an average thickness; the same applies to the following description) of the separator 50 is not especially limited, and can be usually 10 μm or more, typically 15 μm or more, and, for example, 17 μm or more. The upper limit can be 40 or less, typically 30 μm or less, and, for example, 25 μm or less. When the thickness of the separator falls in the above-described range, permeability of the charge carrier can be satisfactorily retained, and in addition, a minute short circuit (leakage current) is more difficult to occur. Therefore, input/output density and the safety can be both attained at high level.

As the non-aqueous electrolyte solution, one obtained by dissolving or dispersing, in a non-aqueous solvent, a supporting salt used as the electrolyte (such as a lithium salt, a sodium salt or a magnesium salt, a lithium salt being used in a lithium ion battery) can be used without particular limitation. Alternatively, the non-aqueous electrolyte solution may be so called a polymer electrolyte obtained by gelation through addition of a polymer to a non-aqueous electrolyte in the form of a liquid, or a solid electrolyte or the like. As the non-aqueous solvent, various organic solvents of carbonates, ethers, esters, nitriles, sulfones, and lactones used as an electrolyte solution in a general lithium ion battery can be used without particular limitation. Specific examples include chain carbonates such as diethyl carbonate (DEC), dimethyl carbonate (DMC) and ethyl methyl carbonate (EMC), and cyclic carbonates such as ethylene carbonate (EC), and propylene carbonate (PC). In particular, a solvent that is decomposed in an acidic environment of the positive electrode to generate a hydrogen ion (such as a cyclic carbonate) is preferably partly contained. Such a non-aqueous solvent may be fluorinated. Besides, these non-aqueous solvents can be used singly or as a mixed solvent of two or more. As the supporting salt, any of various salts used in a general lithium ion battery can be appropriately selected to be used. Examples include lithium salts such as $LiPF_6$, $LiBF_4$, $LiClO_4$, $LiAsF_6$, $Li(CF_3SO_2)_2N$, and $LiCF_3SO_3$. Since the technique disclosed herein provides the effect of reducing the heat generation at the time of overcharge, the effects of the present technique can be preferably clearly exhibited when a lithium compound containing fluorine, which is decomposed at the time of overcharge to generate hydrogen fluoride (HF), is used as the supporting salt. These supporting salts may be used singly or in combinations of two or more. The supporting salt may be adjusted to a concentration, in the non-aqueous electrolyte, of 0.7 mol/L to 1.3 mol/L.

Besides, the non-aqueous electrolyte may contain various additives as long as the characteristics of the lithium ion battery of the present disclosure are not impaired. These additives can be used as a gas generating agent, a film forming agent and the like for one, two or more purposes of improvement of the input/output characteristics, improvement of a cycle characteristic, improvement of initial charge/discharge efficiency of the battery, and the like. Specific examples of the additives include fluorophosphate (preferably difluorophosphate, such as lithium difluorophosphate represented by $LiPO_2F_2$), an oxalate complex compound such as lithium bis(oxalato)borate (LiBOB). A concentration of such an additive in the non-aqueous electrolyte solution is usually adequately 0.1 mol/L or less (typically, 0.005 mol/L to 0.1 mol/L).

The lithium ion battery 1 illustrated in FIG. 1 includes a flat rectangular battery case used as the battery case 10. The battery case 10 may be, however, a non-flat rectangular battery case, a cylindrical battery case, a coin type battery case or the like. Alternatively, the lithium ion battery 1 may include a laminate bag formed, into a bag shape, by adhering a metal sheet (typically, an aluminum sheet) and a resin sheet to each other. Besides, the battery case may be made of, for example, aluminum, iron, or an alloy of these metals, or a high-strength plastic or the like. Furthermore, the lithium ion battery 1 illustrated in FIG. 1 includes so called the wound electrode assembly 20 in a form obtained by stacking the positive electrode 30 and the negative electrode 40, both having a large length, in an insulated state from each other by the two separators 50, and winding the resultant around the winding axis WL to have an elliptical cross-section. As illustrated in FIG. 2, a width W1 of the positive electrode active material layer 34, a width W2 of the negative electrode active material layer 44, and a width W3 of the separator satisfy a relationship of W1<W2<W3. In addition, the negative electrode active material layer 44 covers the positive electrode active material layer 34 at both ends in the widthwise direction, and the separator 50 covers the negative electrode active material layer 44 at both ends in the widthwise direction. The electrode assembly 20 of the lithium ion battery 1 disclosed herein is, however, not limited to the wound electrode assembly, and may be, for example, so called a stacked flat electrode assembly 20 in a form obtained by stacking a plurality of positive electrodes 30 and negative electrodes 40 insulated from one another by separators 50. Alternatively, the battery may be a single cell obtained by housing one positive electrode 30 and one negative electrode 40 in a battery case.

The battery case 10 typically includes a case body 11 having an opening on one surface, and a covering member 12 covering the opening. The covering member 12 may be provided, similarly to a battery case of a conventional lithium ion battery, with a safety valve for discharging a gas generated inside the battery case to the outside, an injection port through which the electrolyte solution is injected, and the like. Besides, on the covering member 12, a positive electrode terminal 38 and a negative electrode terminal 48 for external connection can be typically provided in an insulated state from the battery case 10. The positive electrode terminal 38 and the negative electrode terminal 48 are electrically connected to the positive electrode 30 and the negative electrode 40 via a positive electrode collector terminal 38a and a negative electrode collector terminal 48a, respectively, so that electric power can be supplied to an external load.

The lithium ion battery disclosed herein is applicable to various usages, and as compared with a conventional product, for example, resistance can be reduced even through repeated charge/discharge at a high rate as well as high safety can be provided. Besides, the lithium ion battery can attain both these excellent battery performances and reliability (embracing safety such as thermal stability at the time of overcharge) at high level. Accordingly, the battery can be suitably used, owing to these characteristics, in application requiring a high energy density and a high input/output density and application requiring high reliability. An example of these applications includes a driving power supply for a vehicle such as a plug-in hybrid vehicle, a hybrid vehicle, or an electric vehicle. It is noted that such a secondary battery can be used typically in the form of a battery pack in which a plurality of secondary batteries are connected to one another in series and/or in parallel.

Now, some examples of the present disclosure will be described, and it is noted that these specific examples are not intended to limit the present disclosure.

Preparation of Positive Electrode Active Material

A positive electrode active material of each example was prepared as follows: Acetates of nickel (Ni), cobalt (Co) and manganese (Mn) were dissolved in water to obtain a molar ratio among Ni, Co and Mn of 1:1:1 to prepare a NiCoMn aqueous solution. To the NiCoMn aqueous solution, a sodium hydroxide aqueous solution having pH of 11 to 14 (having a liquid temperature of 25° C.) was added for neutralization, so as to deposit a hydroxide (precursor) of NiCoMn in the form of a sol. To the precursor thus obtained, lithium carbonate ($Li_2CO_3$) used as a lithium source was added, and the resultant was homogeneously mixed and fired to obtain a positive electrode active material containing a lithium transition metal oxide. It is noted that the amount of the lithium source was rather excessively adjusted such that the amount of lithium could be a total amount of a 1.1-fold mol amount of the transition metals and a 3-fold mol amount of phosphorus used for forming a coating portion described later. The positive electrode active material was appropriately crushed into the form of a powder having an average particle size of about 5 μm.

Subsequently, at room temperature (25° C.), 30 g of the positive electrode active material was suspended in 100 mL of a pure water/xylene (1:1) mixture, yttrium (III) nitrate hexahydrate ($Y(NO_3)_3 \cdot 6H_2O$) used as a yttrium source was added thereto in a prescribed amount, and the resultant was stirred for 15 minutes and filtered for collecting the positive electrode active material. The positive electrode active material thus filtered was suspended again in 100 mL of pure water, ammonium dihydrogen phosphate (($NH_4)_2HPO_4$) was added thereto in a prescribed amount, and the resultant was stirred for 30 minutes, filtered and dried to obtain a Y-containing LPO-coated positive electrode active material.

At this point, the amount of ammonium dihydrogen phosphate added was adjusted such that $Li_3PO_4$ in a stoichiometric ratio could be formed in a ratio of 1 part by mass per 100 parts by mass of the positive electrode active material. Besides, the amount of the yttrium (III) nitrate hexahydrate added was adjusted such that a ratio of Y could be an amount Y (a molar ratio [y]) shown in Table 1 below per mol of the amount of ammonium dihydrogen phosphate ($NH_4H_2PO_4$) added. The drying performed last was performed in the air atmosphere, and a drying temperature was set to 400° C. in Examples 1 to 6 and 14, and to 100° C. in Examples 7 to 13 as shown in Table 1 below. Besides, in Examples 1 to 2 and 4 to 6, a proportion between a stirring time employed in adding the yttrium source and a stirring time employed in adding the phosphoric acid source was set to be different with reference to the aforementioned stirring times. Besides, in Example 14, after the yttrium source was added and the resultant was stirred at room temperature, a step of stirring the resultant for 5 minutes in a low temperature environment of 5° C. or less was additionally performed before filtering. In this manner, Y-containing LPO-coated positive electrode active materials of Examples 1 to 14 were prepared. It is noted that, for reference, an LPO-coated positive electrode active material to which no yttrium source was added was prepared as Reference Example.

ICP Analysis of Y-Containing LPO-Coated Positive Electrode Active Material

The Y-containing LPO-coated positive electrode active material of each example was subjected to inductivity coupled plasma (ICP) atomic emission spectroscopy for qualitative and quantitative analysis. Specifically, a prescribed amount of the Y-containing LPO-coated positive electrode active material was weighed to be dissolved in a mixed acid of hydrofluoric acid and nitric acid to prepare an analysis sample. Then, identification and quantitative determination by an internal standard method were performed on the following elements to be measured and mass numbers to be measured: Li: 7, Mn: 55, Co: 59, Ni: 60, Y: 89, and P: 31. For analysis of P, emission spectrography was employed. As a result, it was confirmed that the composition of each Y-containing LPO-coated positive electrode active material was consistent with compositions of raw materials used.

XRD Analysis of Y-Containing LPO-Coated Portion

The Y-containing LPO-coated positive electrode active material of each example was subjected to XRD analysis to check the constituent phase. As a result, a peak derived from $LiNi_{1/3}Co_{1/3}Mn_{1/3}O_2$ (NCM) having a layered rock salt crystal structure was clearly detected in all the Y-containing LPO-coated positive electrode active materials, and hence it was confirmed that these positive electrode active materials contain NCM as a main phase. Besides, it was checked whether or not a peak attributed to trilithium phosphate ($Li_3PO_4$:LPO) and an analog thereof was detected as a coating portion in addition to NCM. When such a peak was detected, it was determined that the coating portion was crystalline, and "Crystalline" was put in a column corresponding to "Crystallinity" of Table 1, and when was not detected, "Amorphous" was put in the column. Besides, when a peak attributed to yttrium nitrate used as the yttrium source was detected in addition to those of NCM, LPO and an analog thereof, "Contained" was put in a column corresponding to "Sub Phase" of Table 1, and when not detected, "None" was put in the column.

Concentration Distribution of Y-Containing LPO-Coated Portion

The Y-coated positive electrode active material of each example was subjected to scanning electron microscope/ energy dispersive X-ray spectroscopy (SEM-EDS) analysis to check the structure of the coating portion formed on the surface of the positive electrode active material. Specifically, a surface SEM image obtained such that one particle of the positive electrode active material could occupy the whole field of view was divided into 100 analysis regions by dividing X and Y directions (lengthwise and widthwise directions of the image) each into tenths. Then, lithium (Li), yttrium (Y), phosphorus (P) and oxygen (O) present on the surface of the positive electrode active material particle were each quantitatively analyzed. As a result, it could be confirmed that Li, Y, P and O were present in high ratios on the surface of the positive electrode active material particle. Besides, based on signal intensities, abundances $C_Y$ and $C_P$ of Y and P in each analysis region were calculated. This analysis was performed on 20 positive electrode active material particles of each example.

Thereafter, an analysis region in which Y was detected was first determined as the coating portion, and the analysis region corresponding to the coating portion was further analyzed as follows: An atomic ratio Y/P of Y in the total amount of Y and P was calculated in accordance with an expression, $Y/P=C_Y/C_P$. An analysis region having the atomic ratio Y/P of 1 or more was defined as a Y-rich region A, and an analysis region having the atomic ratio Y/P of less than 1 was defined as a Y-poor region B. In analysis regions corresponding to the coating portion included in one positive electrode active material particle, a localization ratio R of the element Y in one positive electrode active material particle was calculated based on the number $N_A$ of the Y-rich regions A and the number $N_B$ of the Y-poor regions B in accordance with an expression, $R=N_A/(N_A+N_B)$. An arithmetic mean of the localization ratios R of the element Y calculated with respect to the 20 positive electrode active material particles was put in a column corresponding to "Y Localization Ratio" of Table 1.

Production of Evaluation Battery

The Y-containing LPO-coated positive electrode active material of each example was used to produce a non-aqueous electrolyte secondary battery for evaluation. Specifically, the positive electrode active material prepared as described above, acetylene black (AB) used as a conductive material, and polyvinylidene fluoride (PVdF) used as a binder were mixed in a mass ratio of 90:8:2 with N-methylpyrrolidone (NMP) to prepare a positive electrode slurry having a solid content of 60% by mass. The slurry was applied, with a die coater, onto both surfaces of a long aluminum foil used as a positive electrode collector, and the resultant was dried and pressed to prepare a sheet-shaped positive electrode (Examples 1 to 14, and Reference Example). It is noted that a non-coated portion in which the positive electrode active material layer was not formed was provided along one end portion in the widthwise direction for current collection in each positive electrode.

A natural graphite powder used as a negative electrode active material, a styrene-butadiene copolymer (SBR) used as a binder, and carboxymethylcellulose (CMC) used as a thickener were mixed in a mass ratio of 98:1:1 with ion-exchanged water to prepare a negative electrode slurry. The slurry was applied, with a die coater, onto both surfaces of a long copper foil used as a negative electrode collector, and the resultant was dried and pressed to prepare a sheet-shaped negative electrode including a negative electrode active material layer formed on the negative electrode collector. It is noted that a non-coated portion in which the negative electrode active material layer was not formed was provided along one end portion in the widthwise direction for current collection in each negative electrode.

Next, the sheet-shaped positive electrode and the sheet-shaped negative electrode thus prepared were stacked on each other with two separators disposed therebetween for insulating from each other, and the resultant was wound to obtain a wound electrode assembly. At this point, the positive electrode and the negative electrode were stacked on each other such that the non-coated portion of the positive electrode and the non-coated portion of the negative electrode could be positioned on different sides in the widthwise direction, and that the negative electrode active material layer could be protruded on the both sides in the widthwise direction beyond the positive electrode active material layer. As each separator, a microporous sheet having a PP/PE/PP three-layered structure was used. The non-coated portion of the positive electrode and the non-coated portion of the negative electrode of the wound electrode assembly thus prepared were connected to a positive electrode terminal and a negative electrode terminal, respectively, of a battery case, the resultant was housed in a case body together with a non-aqueous electrolyte solution, and the resultant battery case was sealed to obtain a non-aqueous electrolyte secondary battery for evaluation of each of Examples 1 to 14 and Reference Example. The non-aqueous electrolyte solution used was obtained by dissolving $LiPF_6$ used as a supporting salt in a concentration of 1 mol/L in a mixed solvent containing ethylene carbonate (EC), dimethyl carbonate (DMC) and ethyl methyl carbonate (EMC) in a volume ratio of EC:DMC:EMC of 1:1:1.

Conditioning and Initial Capacity

The evaluation battery of each example obtained as above was first charged with a constant current (CC) in a temperature environment of 25° C. at a rate of 1/3 C to 4.2 V, and then charged with a constant voltage (CV) to obtain a current value of 1/50 C, and thus, a state of charge (SOC) of the battery was set to full charge (SOC of 100%). Thereafter, in a temperature environment of 25° C., the charge/discharge was paused for 5 minutes, and then the battery was discharged with CC at a rate of 1/3 C to 3.0 V. It is noted that a discharge capacity with CC obtained here was defined as an initial capacity. Besides, the term "1 C" means a current value with which a battery capacity (Ah) estimated based on the theoretical capacity of the active material can be charged in 1 hour.

Output Resistance at Low Temperature

The output resistance in a low temperature environment of the evaluation battery of each example after the conditioning was measured. First, an open circuit voltage of the evaluation battery of each example was adjusted to 3.70 V in a temperature environment of 25° C. Then, each battery was discharged with CC at a discharge rate of 10 C to a voltage of 3.00 V in a temperature environment of −10° C. At this point, an IV resistance value (5-second value) was calculated based on an inter-terminal voltage value obtained 5 seconds after starting the discharge, and a discharge current value. The result was standardized assuming that a resistance value of the evaluation battery of Example 1 was 100, and is put in a column corresponding to "Low Temperature Resistance Characteristic" of Table 1.

Overcharge Characteristic

A heat generation characteristic at the time of overcharge of the evaluation battery of each example after the conditioning was evaluated. The evaluation battery of each example was first overcharged in a temperature environment of 25° C. until SOC became 150%. Thereafter, the battery was carefully broken, and 3 mg of the positive electrode active material layer and 3 µL of the electrolyte solution were collected from the sheet-shaped positive electrode, and were put in a sample holder of a differential scanning calorimeter (DSC). The positive electrode active material layer and the electrolyte solution thus obtained were used as a sample to perform differential scanning calorimetry. As the measurement conditions, an Ar atmosphere was employed, and heating was performed from room temperature (25° C.) to 400° C. at a temperature increasing rate of 5° C./min. Then, a heat generation amount obtained during the heating from room temperature to 200° C. was integrated to obtain a total heat generation amount, and the result was standardized assuming that the total heat generation amount of the evaluation battery of Example 1 was 100, and was put in a column corresponding to "Overcharge Characteristic" of Table 1.

formula, $LiNi_{1/3}Co_{1/3}Mn_{1/3}O_2$. Besides, it was found that the yttrium lithium phosphate present on the surface covers, in the form of a layer, the surface of the lithium transition metal oxide particle as the coating portion. On the contrary, in each of the Y-containing LPO-coated positive electrode active materials of Examples 7 to 13, a peak derived from trilithium phosphate and an analog thereof was not found in the XRD analysis. It can be said that the yttrium lithium phosphate having the above-described composition is formed in the form of amorphous in Examples 7 to 13. When a surface of a positive electrode active material particle is coated with LPO in general, crystallization of LPO is unavoidably caused if the liquid phase method is employed. When Y having a positive charge is added to the basic skeleton of LPO, however, these elements interact with a phosphoric acid group having a negative charge, and therefore, an amorphous state can be probably retained under certain conditions. Although not specifically described, according to examination made by the present inventors, it was found that the coating portion can be substantially amorphous when a heat treatment temperature employed in Y coating is set to about 300° C. or less, and that the coating portion is substantially crystallized when the heat treatment temperature is about 300° C. or more.

Through comparison between Reference Example and Example 1, it was found that when Y is contained in the coating portion, both the resistance characteristic at a low temperature and the overcharge characteristic can be improved largely (by, for example, about −20%) as compared with a case where Y is not contained. In other words, it was found that when Y is contained in LPO corresponding to the coating portion, the resistance at a time of high rate output in a low temperature environment can be reduced, and the heat generation at the time of overcharge can be reduced to be small. This is probably because a plurality of

TABLE 1

| Example | Amount Y [y] | Stirring Condition | Drying Temperature [° C.] | Crystallinity | Y Localization Ratio [—] | Sub Phase | Low Temperature Resistance Characteristic [—] | Overcharge Characteristic [—] |
|---|---|---|---|---|---|---|---|---|
| Reference Example | 0 | Changed | 400 | Clystalline | — | None | 120 | 120 |
| 1 | 0.005 | | | Clystalline | 0.005 | None | 100 | 100 |
| 2 | 0.005 | | | Clystalline | 0.01 | None | 71 | 81 |
| 3 | 0.005 | Standard | | Clystalline | 0.1 | None | 70 | 78 |
| 4 | 0.005 | Changed | | Clystalline | 0.3 | None | 72 | 80 |
| 5 | 0.005 | | | Clystalline | 0.5 | None | 69 | 83 |
| 6 | 0.005 | | | Clystalline | 0.7 | None | 98 | 103 |
| 7 | 0.005 | Standard | 100 | Amorphous | 0.1 | None | 62 | 81 |
| 8 | 0.01 | | | Amorphous | 0.1 | None | 51 | 62 |
| 9 | 0.1 | | | Amorphous | 0.1 | None | 50 | 58 |
| 10 | 1 | | | Amorphous | 0.1 | None | 49 | 60 |
| 11 | 1.5 | | | Amorphous | 0.1 | None | 51 | 59 |
| 12 | 2 | | | Amorphous | 0.1 | None | 52 | 64 |
| 13 | 3 | | | Amorphous | 0.1 | None | 60 | 85 |
| 14 | 0.005 | Standard | 400 | Clystalline | 0.1 | Contained | 68 | 58 |

Evaluation

Based on the results of the ICP analysis, the XRD analysis and the SEM-EDS analysis, it was found that in each of the LPO-coated positive electrode active materials of Reference Example and Examples 1 to 6, trilithium phosphate ($Li_3PO_4$) having the $Li_3PO_4$ crystal structure as the basic skeleton and an analog thereof (yttrium lithium phosphate represented by a general formula, $Li_3Y_yPO_4$, wherein y=0.005 to 3) are formed on the surface of the lithium transition metal oxide particle represented by the general Y present in the crystal structure of $Li_3PO_4$ having ionic conductivity cause large strain in the crystal structure to make contribution to improvement of the ionic conductivity of LPO. Besides, Y contained within the ionic conductor of LPO probably trap oxygen released from the positive electrode active material having been made unstable in an overcharged state, namely, in a state where Li has been extracted, so as to reduce the heat generation caused through a reaction of the oxygen with the electrolyte.

Through comparison between Example 3 and Example 7, it was found that the low temperature resistance characteristic can be further improved when the coating portion is amorphous than when it is crystalline. Even when the coating portion is crystalline, the ionic conductivity is increased due to structural strain caused by Y with a phosphoric acid group as described above, resulting in obtaining the resistance reduction effect. When the coating portion is amorphous, however, an ion conduction path is three-dimensionally expanded out of the basic skeleton to further improve the degree of ionic conductivity, and probably for this reason, the resistance reduction effect is remarkably increased.

In Examples 1 to 6, the addition amount of Y to LPO was fixed to 0.005 in the coating portion, and a stirring time was changed between stirring performed in Y addition and stirring performed in phosphoric acid group addition. It was found that when the production condition (stirring condition) in forming the coating portion is thus changed, the localization ratio R of Y on the surface of the positive electrode active material particle, namely, the ratio of the region A in which the ratio of Y is rich, is increased/reduced. In addition, it was found that the resistance characteristic at a low temperature and the overcharge characteristic are also changed when the localization ratio R of Y is changed. It was found that the resistance characteristic at a low temperature is improved as the localization ratio R of Y in the coating portion is increased from 0.005, and that the improving effect is the maximum when the localization ratio R of Y is 0.5. When the localization ratio R of Y is increased up to 0.7, however, the improving effect is weakened to a level obtained at the localization ratio of Y of 0.005, and thus, it was found that excessive localization of Y is not preferable. Besides, it was found that the overcharge characteristic is improved as the localization ratio R of Y in the coating portion is increased from 0.005, that the improving effect is the maximum when the localization ratio R of Y is 0.1, and that the improving effect tends to be reduced as the localization ratio R of Y is further increased.

In some cases, the region A in which the ratio of Y is rich is relatively inferior, in the ionic conductivity, to the region B in which the ratio of Y is poor. Accordingly, in a plane direction of the coating portion, the affinity between a lithium ion and Y can largely differ on the interface between the region A and the region B. Here, when the region A is present in an appropriate ratio, the interface with the region B is increased, and hence, the ionic conductivity in the interface (ion supply property to the active material particle) is probably increased. When the ratio of the region A is excessively increased, however, the ionic conductivity of the whole coating portion is lowered on the contrary, and hence the resistance reduction effect can be impaired. Besides, on the interface between the region A and the region B, deviation of the cationic lithium ion is caused, and hence the trapping performance for anionic oxygen is presumed to increase. Although the detail is not clear, it is presumed that when the region A is present in an appropriate ratio, oxygen is appropriately trapped on the interface, and hence the amount of the heat generation at the time of overcharge is suitably reduced. Such remarkable improving effects of the low temperature resistance characteristic and the overcharge characteristic have not been expected so far. Based on the results of Examples 1 to 6, it can be said that the localization ratio R of Y is more preferably about 0.01 to 0.5.

In Examples 7 to 13, the addition amount of merely Y contained in LPO was changed in the coating portion. It was found that when the addition amount of Y is changed, the resistance characteristic at a low temperature and the overcharge characteristic are also changed. It was found that the resistance characteristic at a low temperature is improved as the content of Y in the coating portion is increased from 0.005, that the improving effect is the maximum when the content of Y is 1, and that the improving effect tends to be reduced as the content of Y is further increased. This is probably because the effect of causing strain in the skeleton of LPO is obtained to improve the ionic conductivity when the content of Y is increased, but excessive addition of Y lowers the ionic conductivity on the contrary. It was found that the overcharge characteristic is remarkably improved when the content of Y in the coating portion is increased from 0.005 to 0.01, but is not largely changed when the content of Y is increased up to about 1.5, and that the improving effect is reduced to a level obtained at the content of 0.005 when the content of Y exceeds about 1.5. It is understood that the content of Y may be about 0.01 to 2.

In Example 14, yttrium nitrate used as the yttrium source was deposited on the surface of the positive electrode active material particle in addition to the coating portion containing the yttrium lithium phosphate. Through comparison between Example 3 and Example 14, it was confirmed that the resistance characteristic at a low temperature and the overcharge characteristic are both largely improved when yttrium nitrate is deposited on the surface of the positive electrode active material particle. Mechanism for reducing the heat generation at the time of overcharge by a yttrium salt is not clear, but is presumed as follows: A yttrium salt is easily hydrated, and hence the yttrium salt in a hydrated state is dehydrated at the time of heat generation caused by overcharge, and the heat generation amount is reduced by a heat absorbing reaction occurring at the time of dehydration. Based on this, an aspect in which the positive electrode active material contains a yttrium salt in addition to the coating portion containing the yttrium lithium phosphate is also preferable.

In this manner, it was confirmed that the positive electrode active material disclosed herein can reduce the output resistance in a low temperature environment to largely improve the input/output characteristic. Besides, the heat generation amount at the time of overcharge can be reduced, and hence, even when overcharge occurs, further heat generation can be reduced to safely stop the electrochemical reaction. As a result, a non-aqueous electrolyte secondary battery capable of attaining both improvement of the output characteristic at a low temperature and safety against overcharge is provided. Although the specific examples of the present disclosure have been described in detail, it is noted that these are merely illustrative and the present disclosure embraces various modifications and changes of the specific examples described above.

What is claimed is:

1. A non aqueous electrolyte secondary battery comprising:
   a positive electrode comprising a positive electrode active material,
   a negative electrode, and
   a non aqueous electrolyte,
   wherein the positive electrode active material includes:
   a positive electrode active material particle containing a lithium transition metal compound, and
   a coating portion coating at least a part of a surface of the positive electrode active material particle,
   the coating portion comprises a lithium ionic conductor comprising lithium, a phosphoric acid group, and yttrium, and the lithium ionic conductor includes:

a region A in which a ratio of yttrium is relatively rich, and a region B in which the ratio of yttrium is relatively poor.

2. The non aqueous electrolyte secondary battery according to claim 1, wherein the lithium ionic conductor is amorphous.

3. The non aqueous electrolyte secondary battery according to claim 1, wherein the lithium ionic conductor is represented by the following general formula:

$$Li_xY_yPO_{4-z},$$

wherein x, y and z satisfy 1.5≤x≤4, 0.005≤y≤3 and 0≤z≤4.

4. The non aqueous electrolyte secondary battery according to claim 1, wherein the ratio of yttrium is equal to or higher than a ratio of phosphorus in the region A, the ratio of yttrium is lower than a ratio of phosphorus in the region B, and a ratio R of an area of the region A to a total area of the region A and the region B is 0.01 or more and 0.5 or less.

5. The non aqueous electrolyte secondary battery according to claim 1, wherein the coating portion further contains a yttrium salt.

6. A positive electrode active material comprising:

a positive electrode active material particle containing a lithium transition metal compound, and a coating portion coating at least a part of a surface of the positive electrode active material particle, wherein the coating portion comprises a lithium ionic conductor comprising lithium, a phosphoric acid group, and yttrium, and the lithium ionic conductor includes:

a region A in which a ratio of yttrium is relatively rich, and a region B in which the ratio of yttrium is relatively poor.

* * * * *